United States Patent
Sadeghi et al.

(10) Patent No.: US 9,654,604 B2
(45) Date of Patent: May 16, 2017

(54) APPARATUS, SYSTEM AND METHOD OF CONTROLLING DATA FLOW OVER A COMMUNICATION NETWORK USING A TRANSFER RESPONSE

(71) Applicant: Intel Corporation, Santa Clara, CA (US)

(72) Inventors: Bahareh Sadeghi, Portland, OR (US); Elad Levy, Rishon LeZion (IL); Oren Kedem, Modiin Maccabim-Reut (IL); Rafal Wielicki, Gdansk (PL); Marek Dabek, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 820 days.

(21) Appl. No.: 13/798,594

(22) Filed: Mar. 13, 2013

(65) Prior Publication Data

US 2014/0140197 A1  May 22, 2014

Related U.S. Application Data

(60) Provisional application No. 61/729,369, filed on Nov. 22, 2012.

(51) Int. Cl.
| | | |
|---|---|---|
| *H04L 29/14* | (2006.01) | |
| *H04L 29/08* | (2006.01) | |
| *H04L 1/18* | (2006.01) | |
| *H04L 29/06* | (2006.01) | |

(52) U.S. Cl.
CPC ............ *H04L 69/40* (2013.01); *H04L 1/1812* (2013.01); *H04L 69/28* (2013.01); *H04L 69/324* (2013.01)

(58) Field of Classification Search
CPC ..... H04L 1/1812; H04L 69/28; H04L 69/324; H04L 69/40
See application file for complete search history.

(56) References Cited

U.S. PATENT DOCUMENTS

| | | | |
|---|---|---|---|
| 5,463,382 A | 10/1995 | Nikas et al. | |
| 5,754,548 A | * 5/1998 | Hoekstra | ............. G06F 13/4054 370/402 |
| 5,883,893 A | 3/1999 | Rumer et al. | |
| 5,920,699 A | 7/1999 | Bare | |

(Continued)

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.

(Continued)

*Primary Examiner* — Dung B Huynh
(74) *Attorney, Agent, or Firm* — Shichrur & Co.

(57) ABSTRACT

Some demonstrative embodiments include apparatuses, systems and/or methods of controlling data flow over a communication network. For example, an apparatus may include a communication unit to communicate between first and second devices a transfer response, the transfer response in response to a transfer request, the transfer response including a transfer pending status indicating data is pending to be received at the second device, the communication unit is to communicate the transfer response regardless of whether a retry indicator of the transfer request represents a first request for transfer or a retried request.

22 Claims, 4 Drawing Sheets

(56) References Cited

U.S. PATENT DOCUMENTS

| | | | |
|---|---|---|---|
| 6,011,796 A * | 1/2000 | Rezaiifar | H04L 1/165 370/394 |
| 6,438,603 B1 * | 8/2002 | Ogus | H04L 47/10 370/238 |
| 6,782,414 B1 | 8/2004 | Xue et al. | |
| 6,907,042 B1 * | 6/2005 | Oguchi | H04L 47/30 370/230 |
| 7,010,727 B1 | 3/2006 | Stucker | |
| 7,181,511 B1 | 2/2007 | Grenier et al. | |
| 7,334,072 B1 | 2/2008 | Wright | |
| 7,418,524 B2 * | 8/2008 | Beasley | G06F 13/4045 710/2 |
| 7,881,661 B2 | 2/2011 | Mohammadioun et al. | |
| 2001/0012286 A1 | 8/2001 | Huna et al. | |
| 2001/0013080 A1 | 8/2001 | Kameyama et al. | |
| 2002/0004902 A1 | 1/2002 | Toh et al. | |
| 2002/0133596 A1 | 9/2002 | Border et al. | |
| 2002/0161836 A1 * | 10/2002 | Hosomi | 709/203 |
| 2003/0009698 A1 | 1/2003 | Lindeman et al. | |
| 2003/0088679 A1 * | 5/2003 | Hori | H04L 67/2861 709/229 |
| 2004/0103282 A1 * | 5/2004 | Meier | G06Q 20/3674 713/171 |
| 2004/0120486 A1 | 6/2004 | Creamer et al. | |
| 2004/0121759 A1 | 6/2004 | Creamer et al. | |
| 2004/0170175 A1 * | 9/2004 | Frank et al. | 370/392 |
| 2004/0184442 A1 | 9/2004 | Jones et al. | |
| 2005/0009529 A1 * | 1/2005 | Chen | H04W 72/1278 455/450 |
| 2005/0015495 A1 * | 1/2005 | Florkey | H04L 29/06027 709/227 |
| 2005/0033877 A1 * | 2/2005 | McLeod | G06F 13/4013 710/33 |
| 2005/0117582 A1 * | 6/2005 | Biran | H04L 69/16 370/395.4 |
| 2005/0141553 A1 | 6/2005 | Kim et al. | |
| 2005/0210331 A1 | 9/2005 | Connelly et al. | |
| 2006/0164550 A1 | 7/2006 | Yoshimoto et al. | |
| 2006/0168262 A1 * | 7/2006 | Frazer | H04L 29/06 709/230 |
| 2006/0179144 A1 | 8/2006 | Nagase | |
| 2006/0236040 A1 | 10/2006 | Uehara et al. | |
| 2007/0004386 A1 | 1/2007 | Singh et al. | |
| 2007/0086343 A1 * | 4/2007 | Kujawa | H04L 47/10 370/235 |
| 2007/0183451 A1 * | 8/2007 | Lohr | H04L 1/1678 370/473 |
| 2009/0025076 A1 * | 1/2009 | Rowley | G06Q 10/06 726/10 |
| 2009/0067846 A1 | 3/2009 | Yu et al. | |
| 2009/0077159 A1 * | 3/2009 | Murakami | H04L 67/28 709/202 |
| 2009/0154433 A1 | 6/2009 | Jang et al. | |
| 2010/0061272 A1 | 3/2010 | Veillette | |
| 2010/0070665 A1 | 3/2010 | Swaminathan | |
| 2010/0284337 A1 | 11/2010 | Luft et al. | |
| 2011/0058510 A1 | 3/2011 | Thomas et al. | |
| 2011/0199953 A1 | 8/2011 | Seok | |
| 2012/0063376 A1 | 3/2012 | Kambhatla et al. | |
| 2012/0257642 A1 | 10/2012 | Lee et al. | |
| 2012/0281570 A1 * | 11/2012 | Jung | H04L 1/1854 370/252 |
| 2012/0317194 A1 | 12/2012 | Tian | |
| 2013/0039192 A1 * | 2/2013 | Kubota et al. | 370/242 |
| 2013/0132625 A1 * | 5/2013 | Hall | G06F 13/4295 710/106 |
| 2013/0163489 A1 | 6/2013 | Lee et al. | |
| 2013/0191561 A1 * | 7/2013 | Aoki | H04L 13/08 710/57 |
| 2013/0282938 A1 * | 10/2013 | Huang | G06F 13/385 710/106 |
| 2013/0315118 A1 | 11/2013 | Li et al. | |
| 2013/0332504 A1 | 12/2013 | Nishioka et al. | |
| 2014/0055945 A1 | 2/2014 | Sudak | |
| 2014/0269543 A1 | 9/2014 | Li et al. | |
| 2015/0084547 A1 | 3/2015 | Yeh et al. | |

OTHER PUBLICATIONS

IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks-Specific requirements, Mar. 29, 2012.

Wi-Fi Alliance Technical Committee P2P Task Group. Wi-Fi Peer-to-Peer (P2P) Technical Specification. Version 1.2; Dec. 14, 2011; 160 pages.

Universal Serial Bus Mass Storage Class—Bulk-Only Transport, Revision 1.0, Sep. 31, 1999; 22 pages.

Universal Serial Bus Specification, Revision 2.0; Apr. 27, 2000.

Universal Serial Bus 3.0 Specification (including errata and ECNs through May 1, 2011); Revision 1.0; Jun. 6, 2011.

Office Action for U.S. Appl. No. 14/998,244, mailed on Sep. 6, 2016, 45 pages.

Office Action for U.S. Appl. No. 14/998,244 mailed on Mar. 30, 2017, 47 pages.

* cited by examiner

APPARATUS, SYSTEM AND METHOD OF CONTROLLING DATA FLOW OVER A COMMUNICATION NETWORK USING A TRANSFER RESPONSE

CROSS REFERENCE

This application claims the benefit of and priority from U.S. Provisional Patent application No. 61/729,369 entitled "Apparatus, System, and Method of Controlling Data Flow Over a Wireless Communication Link", filed Nov. 22, 2012, the entire disclosure of which is incorporated herein by reference.

TECHNICAL FIELD

Embodiments described herein generally relate to controlling data flow over a communication network.

BACKGROUND

Some wireless communication technologies may be configured for communication of various dedicated services.

For example, the Wireless-Gigabit (WiGig) technology, e.g., according to the *Wireless Gigabit Alliance, Inc WiGig MAC and PHY Specification Version* 1.1, *April* 2011, *Final specification*, is designed to carry multiple dedicated services, such as audio-visual (A/V) and input output (I/O).

The WiGig Alliance (WGA) has defined a set of Protocol Abstraction Layers (PALs), e.g., a WiGig Serial Extension (WSE) PAL and a WiGig Display Extension (WDE) PAL, that standardize the method of transporting traffic of specific industry-standard protocols, e.g. Universal Serial Bus (USB) and DisplayPort, over the WiGig media access control (MAC) layer.

The WSE defines a WSE host communicating with a WSE device over a WiGig wireless link interface. The WSE host can connect and control several WSE devices. Each WSE device can include several USB ports, and each USB port can be attached to a USB device or be extended to several ports via a USB hub.

Since USB devices and/or USB hosts may be configured for communicating over a physical medium, e.g., a USB cable, there may be a problem to perform some operations, e.g., in an efficient seamless and/or transparent manner, via the WSE PAL.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
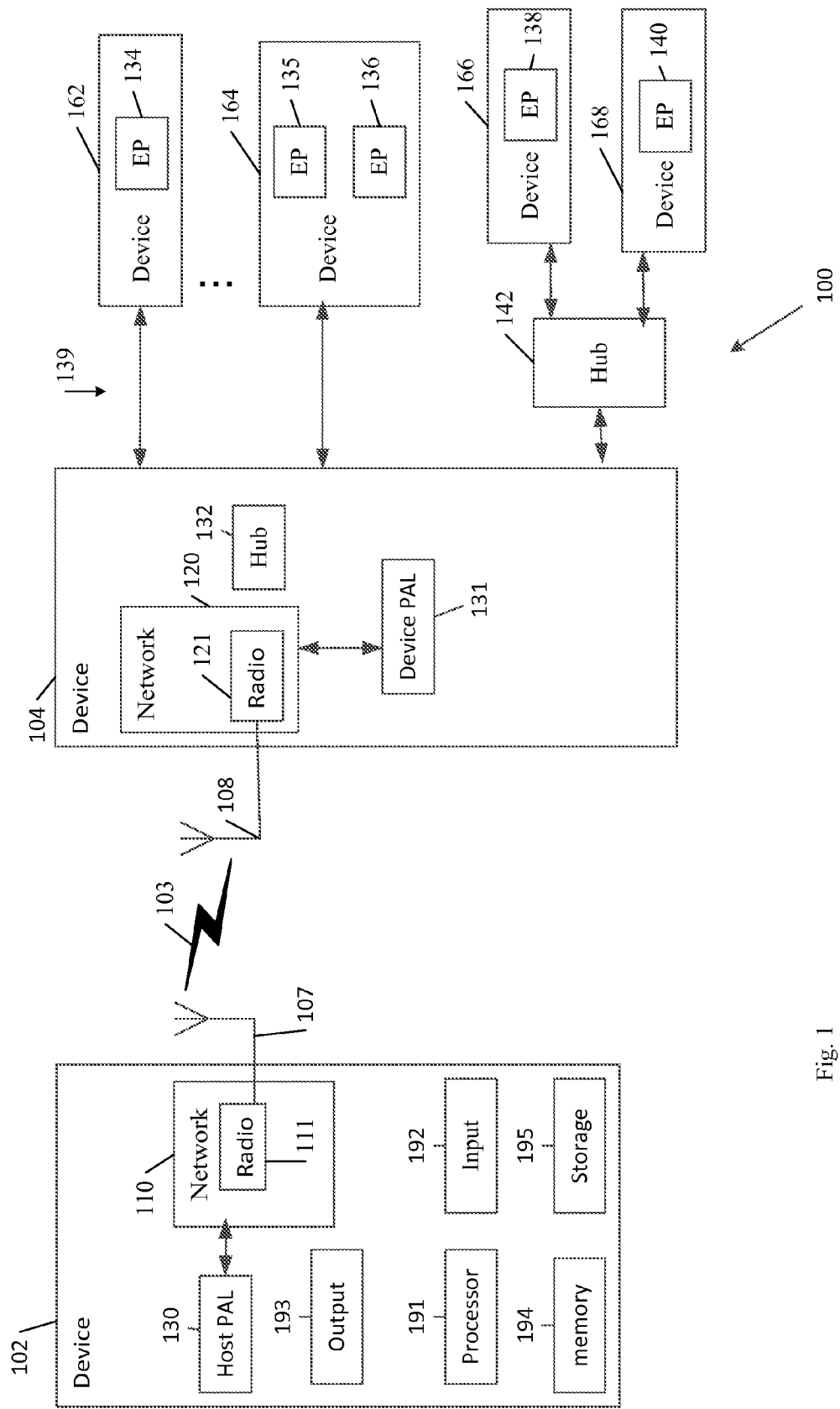
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing WiGig Serial Extension (WSE) protocols (*WiGig Serial Extension (WSE) Specification Draft* 1.02, *August* 2012) and/or future versions and/or derivatives thereof, devices and/or networks operating in accordance with existing WiGig Display Extension (WDE) protocols (*WDE Draft Specification* 1.04, *August* 2012) and/or future versions and/or derivatives thereof, devices and/or networks operating in accordance with existing WiGig Bus Extension (WBE) protocols (*WiGig Bus Extension Spec (WBE), Version* 1.0 *June* 2011) and/or future versions and/or derivatives thereof, devices and/or networks operating in accordance with existing WiGig Secure Digital (SD) Extension (WSD) protocols (*WiGig SD Extension (WSD) PAL Specification Draft* 1.0 *August* 2012) and/or future versions and/or derivatives thereof, devices and/or networks operating in accordance with existing Bulk Only Transfer (BOT) Protocols (*Universal Serial Bus (USB) Mass Storage Class Bulk-Only Transport, Revision* 1.0, *Sep.* 31, 1999) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control (MAC) and Physical Layer (PHY) Specifications, Mar.* 29, 2012; IEEE802.11 task group ac (TGac) ("*IEEE*802.11-09/0308*r*12—*TGac Channel Model Addendum Document*"); *IEEE* 802.11 *task group ad (TGad)* (*IEEE P*802.11ad/D9.0 *Draft Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 5: *Enhancements for Very High Throughput in the* 60 *GHz Band*)), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e*, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), WiGig, Wi-Fi, Internet-Protocol (IP), Wi-Max, ZigBee™, Ultra-Wideband (UWB), Global System for Mobile communication (GSM), 3rd Generation Partnership Project (3GPP), 2G, 2.5G, 3G, 3.5G, Long Term Evolution (LTE), LTE advanced, Fifth Generation (5G) mobile networks, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a WiGig frequency band according to the WGA specification, a WiFi band, a P2P band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to-device communication.

The phrase "Protocol Adaptation Layer (PAL)", as used herein, may include an abstraction layer configured to enable transporting traffic of at least one predefined protocol over a communication link. The predefined standard may include, for example, a specific industry-standard protocol, e.g. USB, DisplayPort, and the like. The PAL may be above a data link layer, for example, a MAC layer, and/or above a transport layer, e.g., a Transmission Control Protocol (TCP) or User Datagram Protocol (UDP), which is above the data link layer. In one example, the data link layer may include, for example, a MAC layer of a wireless link, e.g., a WiFi MAC layer, a WiGig MAC layer, a P2P MAC layer, and the like. In another example, the PAL may be above a transport layer, e.g., a TCP or UDP, which may be configured for transporting traffic over an IP network, e.g., a wired or wireless Internet link and/or Ethernet link.

Some demonstrative embodiment are described herein with respect to a PAL connection over a wireless communication link, for example, a WiGig link, e.g., as described below. However, other embodiments may include a PAL connection over any other wired or wireless communication MAC layer link, e.g., an IP link.

The phrase "PAL communication unit", as used herein, may include a communication element to manage and/or control a PAL connection between a first architectural element, for example, a PAL host, e.g., a USB host, and a second architectural element, for example, a PAL device, e.g., a USB device, over a communication link, e.g., a MAC layer link or a transport layer link, between the PAL communication unit and another PAL communication unit.

In some demonstrative embodiments, the PAL communication unit (also referred to as "PAL manager" or "PAL controller") may perform the functionality of, may include, or may be implemented as part of a WSE Service Set (WSS). For example, the PAL communication unit may perform at least part of the functionality of a WSE device or a WSE host, e.g., as described below. In other embodiments, the PAL communication unit may perform the functionality of any other PAL device, element and/or module.

The phrase "WSE device", as used herein, may include, for example, a WSE architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/any other technologies. In one example, the integrated device may be presented through the WSE device to a host as a USB device compliant with a USB specification, e.g., the USB 2.0 and/or USB 3.0 Specifications.

In one example, the WSE device may optionally include any computing platform, e.g., a portable device, which houses and/or performs the functionality of the WSE device and, optionally, one or more additional elements, e.g., drivers and/or application software, configured to perform the functionality of a peripheral device. In other embodiments, the WSE device may include and/or may be implemented by any other portable or non-portable device.

In some demonstrative embodiments, the WSE device may include USB device logic, e.g., for communicating with a USB device according to a USB Specification, a WSE device PAL, e.g., to control communication over the PAL, and a network interface, e.g., to communicate over the communication link. For example, the WSE device PAL may interface between the USB device logic and the network interface, e.g., in a transparent manner. In other embodiments, the WSE device may include any other elements. In one example, the PAL communication unit may perform the functionality of at least the WSE device PAL.

The phrase "WSE host", as used herein, may include an architectural element of the WSE PAL that includes a communication architecture, e.g., a WiGig MAC and PHY, and USB host logic, e.g., as defined by a USB specification, e.g., the USB 2.0 and/or USB 3.0 Specifications.

In one example, the WSE host may optionally include any computing platform, e.g., a personal computer, which houses and/or performs the functionality of the WSE host and, optionally, one or more additional elements, e.g., drivers and/or application software, configured to perform the functionality of a host device. In other embodiments, the WSE host may include and/or may be implemented by any other portable or non-portable device.

In some demonstrative embodiments, the WSE host may include USB host logic, e.g., for communicating with a USB host according to a USB Specification, a WSE host PAL, e.g., to control communication over the PAL, and a network interface, e.g., to communicate over the communication link. For example, the WSE host PAL may interface between the USB host logic and the network interface, e.g., in a transparent manner. In other embodiments, the WSE host may include any other elements. In one example, the PAL communication unit may perform the functionality of at least the WSE host PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections. The endpoint may be implemented, for example, using any technology, e.g., software, hardware and/or any combination thereof. The first device may include and/or interface between one or more endpoints and the second device.

In one example, the first device may include a WSE device and the second device may include a WSE host. For example, the endpoint may belong to a USB device, e.g., a USB device, which may be integrated into the WSE device or connected, e.g., through a wired USB connection, to the WSE device, e.g., via a hub integrated into the WSE device.

According to this example, the endpoint may be uniquely identified by the WSE host. For example, a combination of a WSE device address of the WSE device and a WSE EP handle assigned to the endpoint may uniquely identify a USB device endpoint within a WSE service set.

In other examples, the first and second devices may include any other, e.g., non-WSE and/or non-USB, device and the endpoint may perform the functionality of any other, e.g., non-USB and/or non-WSE, element.

Reference is now made to FIG. 1, which schematically illustrates a block diagram of a system 100, in accordance with some demonstrative embodiments.

As shown in FIG. 1, in some demonstrative embodiments, system 100 may include a communication network including one or more communication devices, e.g., communication devices 102 and/or 104, capable of communicating content, data, information and/or signals over a communication medium, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include, for example, a PC, a desktop computer, a mobile computer, a laptop computer, a notebook computer, a tablet computer, an Ultrabook™, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 104 may include network interfaces 110 and 120, respectively, to perform communication over a communication network between communication devices 102 and 104 and/or with one or more other devices, e.g., as described below.

Devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102 and/or 104.

In some demonstrative embodiments, network interfaces 110 and/or 120 may include wireless communication units, e.g., including radios 111 and 121, to communicate over a wireless communication medium. For example, radios 111 and/or 121 may include, or may be associated with, one or more antennas 107 and/or 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, radios 111 and/or 121 may include one or more wireless transmitters, receivers and/or transceivers able to send and/or receive wireless communication signals, RF signals, frames, blocks, transmission streams, packets, messages, data items, and/or data. For example, radios 111 and/or 121 may include or may be implemented as part of a wireless Network Interface Card (NIC), and the like.

In some demonstrative embodiments, devices 102 and 104 may establish a communication link 103. Link 103 may be configured for communication over a data link layer, e.g., the MAC layer, a logical link control (LLC) and/or a transport layer. Link 103 may include an uplink and/or a downlink. For example, the uplink may include a link for communicating data from device 104 to device 102, and/or the downlink may include a link for communicating data from device 102 to device 104. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, link 103 may include a wireless communication link, for example, a WiGig link, e.g., as described below. In other embodiments, link 103 may include any other wireless or wired link, e.g., an IP link. According to these embodiments, network interfaces 110 and/or 120 may include any suitable communication unit, e.g., a wired or wireless communication unit, to communicate over the communication network.

In some demonstrative embodiments, devices 102 and 104 may form, or may be part of, a wireless communication network. The wireless communication network may include, for example, a P2P network or any other network.

In some demonstrative embodiments, devices 102 and/or 104 may perform the functionality of DMG stations ("DMG STA"). For example, communication devices 102 and/or 104 may be configured to communicate over the DMG band.

In some demonstrative embodiments, device 102 may include a mobile device and device 104 may include a docking device to connect device 102 to one or more other devices ("peripherals"), for example, including one or more USB devices, e.g., devices 162, 164, 166 and/or 168, and/or any other device.

For example, device 102 may include, or may be included as part of a mobile or portable device, for example, a mobile computer, a laptop computer, a notebook computer, a tablet computer, an Ultrabook™, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 104 may include a docking device configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In some demonstrative embodiments, device 104 may be connected to devices 162, 164, 166 and/or 168 via one or more USB interfaces 139 supporting one or more data transfer rates. For example, device 104 may be connected to one or more of devices 162, 164, 166 and/or 168 via a first USB interface 139 supporting a first data transfer rate, e.g., a USB1.1 interface supporting a data transfer rate of 12 Mega bit per second (Mbps), device 104 may be connected to one or more of devices 162, 164, 166 and/or 168 via a second USB interface 139 supporting a second data transfer rate, e.g., a USB2 interface supporting a data rate of 480 Mbps, and/or device 104 may be connected to one or more of devices 162, 164, 166 and/or 168 via a third USB interface 139 supporting a third data transfer rate, e.g., a USB3 interface supporting a data transfer rate of up to 4.8 Giga bit per second (Gbps).

In some demonstrative embodiments, device 104 may include a hub 132, e.g., a USB hub, to connect between device 104 and one or more of devices 162, 164, 166 and 168. Additionally or alternatively, device 104 may be connected to one or more of devices 162, 164, 166 and 168 via any USB tree, which may include, for example, one or more USB hubs 142. For example, device 102 may include, or may be connected to, one or more USB ports, and each USB port may be connected to a USB device or be extended to several ports via USB hub 132 and/or USB hub 142.

In some demonstrative embodiments, devices 162, 164, 166 and/or 168 may perform the functionality of one or more Endpoints (EPs). For example, a USB device may perform the functionality of one EP or more than one EP. In one example, device 162 may perform the functionality of an EP 134, device 164 may perform the functionality of an EP 135 and an EP 136, device 166 may perform the functionality of an EP 138, and/or device 168 may perform the functionality of an EP 138.

In some demonstrative embodiments, device 102 may include a PAL communication unit 130, and device 104 may include a PAL communication unit 131. PAL communication units 103 and 131 may be configured to manage a PAL connection between devices 102 and 104 over link 103.

In some demonstrative embodiments, devices 102 and 104 may communicate over link 103 according to a WiGig protocol.

In some demonstrative embodiments, devices 102 and 104 may be configured for communication of various dedicated services. For example, the WiGig technology is designed to carry multiple dedicated services, such as audio-visual (A/V) and input output (I/O).

Some demonstrative embodiments are described herein with reference to communicating a data stream including USB data over a wireless communication link according to a WSE protocol. However, other embodiments may be implemented with respect to communicating any other suitable data over any other communication link, according to any other communication protocol and/or over any other layer or PAL.

In some demonstrative embodiments, device 102 may perform the functionality of a USB host and device 104 may perform the functionality of a USB device.

In some demonstrative embodiments, PAL communication unit 130 may perform the functionality of a WSE host and PAL communication unit 131 may perform the functionality of a WSE device.

In some demonstrative embodiments, PAL communication units 130 and 131 may communicate USB traffic over the WSE PAL via link 103. The USB traffic may include, for example, non-periodic (NP) traffic, e.g., bulk and/or control traffic, and/or periodic traffic, e.g., Isochronous and/or Interrupt traffic, which may be communicated by the EPs 134, 135, 136, 138 and/or 140.

In some demonstrative embodiments, the USB traffic may include traffic ("USB IN") delivered from the EPs the EPs 134, 135, 136, 138 and/or 140, via device 104, to device 102, and/or traffic ("USB OUT") delivered from device 102, via device 104, to the EPs the EPs 134, 135, 136, 138 and/or 140.

In some demonstrative embodiments, the USB PAL may enable transport of USB data over media other than USB cable, for example, wireless links, e.g., Wi-Fi or WiGig links, or wired links, e.g., Ethernet. The USB PAL may directly interface with network interfaces 110 and 120, e.g., to replace a network layer in the Open Systems Interconnection (OSI) model, or may be an IP application, interfacing with an IP (e.g., TCP/IP or UDP/IP) stack.

In some demonstrative embodiments, PAL communication unit 130 and PAL communication unit 131 may be configured to enable media-agnostic connectivity of a PAL between devices 102 and 104.

In some demonstrative embodiments, PAL communication unit 130 and PAL communication unit 131 may be configured to enable connectivity of the PAL between devices 102 and 104 over a wireless communication link, for example, a WiGig link, e.g., as described below. However, in other embodiments, PAL communication unit 130 and PAL communication unit 131 may be configured to enable media-agnostic connectivity of the PAL between devices 102 and 104 over any other medium, for example, a Wi-Fi link, an IP link, e.g., internet, Ethernet, over wire or wireless, and the like.

In some demonstrative embodiments the USB PAL may replace a USB physical cable.

For example, PAL communication units 130 and 131 may be configured to interface, e.g., over link 103, between USB host logic, for example, a USB driver at a host platform, e.g., a USB device interface (USBDI) of device 102, and a USB controller of device 104.

According to this example, the combination of PAL communication unit 130, network interface 110, network interface 120, and PAL communication unit 131 may be configured to replace and/or emulate the USB physical cable for connecting between a host device, e.g., device 102, and a USB device, e.g., included by or connected to device 104.

In some demonstrative embodiments, PAL communication units 130 and 131 may be configured to communicate over a USB PAL between a USB host and a USB device. The USB PAL may enable efficient transport of USB traffic by transmitting USB transfers, as opposed to USB transactions. USB transfers may include larger pieces of data, which may be more appropriate for transmission over the wireless links.

However, built-in flow mechanisms for transport of data in USB may not be used, for example, if USB link access mechanisms are not used by the USB PAL.

In some demonstrative embodiments, the USB PAL may utilize a dedicated USB PAL transfer protocol, which may be configured to effectively handle transfer scenarios that may happen as in wired USB, including, for example, a pending IN transfer, which includes data pending to be transferred from a USB device, e.g., an endpoint, to the WSE host.

In some demonstrative embodiments, a host, e.g., device 102, may initiate a USB IN transfer, for example, for transferring a data block ("the requested data block") from an EP of a USB device to the host, e.g., via device 104. For example, PAL communication unit 130 may initiate the USB IN transfer, for example, by transmitting to PAL communication unit 131 a transfer request including an identifier ("Request Identifier (ID)") to identify the requested data block.

In some demonstrative embodiments, the USB IN transfer for the requested data block may be pending, for example, when the USB device is not transferring the requested block of data to device 104.

In such a case, the USB device may send to PAL communication unit 131 a non-acknowledge (NAK) message to inform the host that there is no data to be transmitted.

In some demonstrative embodiments, the PAL communication unit 131 may not forward the NAK messages to the host, for example, to increase the efficiency of the USB PAL transfer protocol.

In some demonstrative embodiments, the PAL communication unit 131 may send a transfer response to PAL communication unit 130, e.g., in response to the transfer request. The transfer response may include an error status, e.g., a Transfer-Pending status, which indicates the transfer of the requested block is pending at the USB device.

Configuring PAL communication unit 131 to wait until PAL communication unit 130 retransmits the transfer request, prior to transmitting the transfer response, configuring PAL communication unit 130 to stop retransmissions, e.g., after receiving the transfer response, and/or configuring PAL communication unit 130 to passively wait for PAL communication unit 131 to respond to the transfer, may result in one or more error cases, e.g., unrecoverable error cases. Such error cases may occur, for example if the communication link between PAL communication unit 130 and PAL communication unit 131 is lost, e.g., while the host is waiting for a response.

In some demonstrative embodiments, PAL communication unit 130 and/or PAL communication unit 131 may utilize a recovery mechanism, which may be configured to enable PAL communication unit 130 and/or PAL communication unit 131 to recover from the error cases, e.g., while maintaining the efficiency of the PAL transfer protocol.

In some demonstrative embodiments, PAL communication unit 131 may be configured to respond to an IN transfer request from PAL communication unit 130 with a transfer-pending status (error), for example, if the transfer request includes a "duplicate" request ID. The transfer request may include a "duplicate" request ID, for example, if the request ID of the transfer request is equal to a request ID, which is already being handled by PAL communication unit 131, e.g., if the transfer request includes a request ID identical to a request ID of a previously received transfer request.

In some demonstrative embodiments, the transfer request may include a retry indicator ("flag") having a first value, e.g., zero, to indicate that the transfer request is to be treated as a first request for the data block, or a second value, e.g., one, to indicate that the transfer request is to be treated as a retried request for the data block.

In some demonstrative embodiments, PAL communication unit 131 may transmit the transfer response including the transfer pending status indicating the requested data block is pending to be received from the endpoint, for example, regardless of whether the retry indicator of the transfer request represents a first request for the data block or a retried request for the data block.

For example, PAL communication unit 131 may be configured to transmit the transfer response including the transfer pending status indicating the requested data block is pending to be received from the endpoint, for example, if the transfer request includes the retry indicator ("flag") having a first value ("the reset value"), e.g., zero, representing that the transfer request should be treated as a first request for the requested data block, or if the transfer request includes the retry indicator having a second value ("the set value"), e.g., one, representing that the transfer request should be treated as a retried request for the requested data block.

This configuration of PAL communication unit 131 may be different from an implementation, which allows PAL communication unit 131 to respond with a transfer-pending status only if the retry flag is set in the transfer request packet from the host.

In some demonstrative embodiments, PAL communication unit 130 may be configured to wait for a pre-determined wait period ("the long timeout"), e.g., upon receipt of a transfer response packet with transfer-pending status, before retransmitting the transfer request.

In some demonstrative embodiments, PAL communication unit 130 may be configured to retransmit the transfer request, e.g., upon completion of the predefined wait period.

In some demonstrative embodiments, the wait period may be set to be long enough, e.g., as not to have an impact on the efficiency of the PAL protocol between PAL communication units 130 and 131, while allowing for PAL communication unit 130 to detect whether or not there has been any change in network conditions of the communication link between PAL communication units 130 and 131.

In some demonstrative embodiments, PAL communication unit 130 may be configured to retransmit the transfer request including the retry flag at the reset value, e.g., the value zero, which may represent that the transfer request should be treated as a first request for the requested data block, for example, although the transfer request is being retransmitted. For example, PAL communication unit 130 may reset a retransmission counter of PAL communication unit 130 upon receiving the transfer response packet with transfer-pending status.

In some demonstrative embodiments, the retransmitted transfer request may be handled as a first (new) transfer request packet transmitted, e.g., as if there has not been any transfer-pending status detected earlier, for example, since the retry flag of the retransmitted transfer request may be set to the reset value.

In some demonstrative embodiments, this configuration of PAL communication unit 130 may be different from an implementation, which may require a PAL host not to take any action upon receiving the transfer response with the pending status, and/or to passively wait for PAL communication unit 131 to send the requested data block in a later transfer response.

In some demonstrative embodiments, PAL communication unit 131 may transmit to PAL communication unit 130 a transfer response including the requested data block, e.g., upon receiving the requested data block from the USB device.

In some demonstrative embodiments, PAL communication unit 130 and/or PAL communication unit 131 may be configured to implement an acknowledge (ACK) mechanism for acknowledging receipt of the requested data block at PAL communication unit 130.

In some demonstrative embodiments, PAL communication unit 131 may require PAL communication unit 130 to acknowledge the receipt of the transfer response including the requested data block, for example, by setting an ACK-required indicator (flag) in the transfer response packet.

In some demonstrative embodiments, PAL communication unit 130 may acknowledge the receipt of the transfer response including the requested data block, for example, by responding to the transfer request with a transfer acknowledgement packet.

In some demonstrative embodiments, PAL communication unit 131 may retransmit the packet, e.g., for a predefined number of times, for example, if PAL communication unit 131 does note receive the ACK packet from PAL communication unit 130.

In some demonstrative embodiments, configuring PAL communication unit 130 and/or PAL communication unit 131 to utilize the acknowledgement mechanism may be different from an implementation, which does not require PAL communication unit 130 to acknowledge the first transfer response packet following a transfer pending status, and/or does not allow PAL communication unit 131 to retransmit a transfer response.

Figure 2:
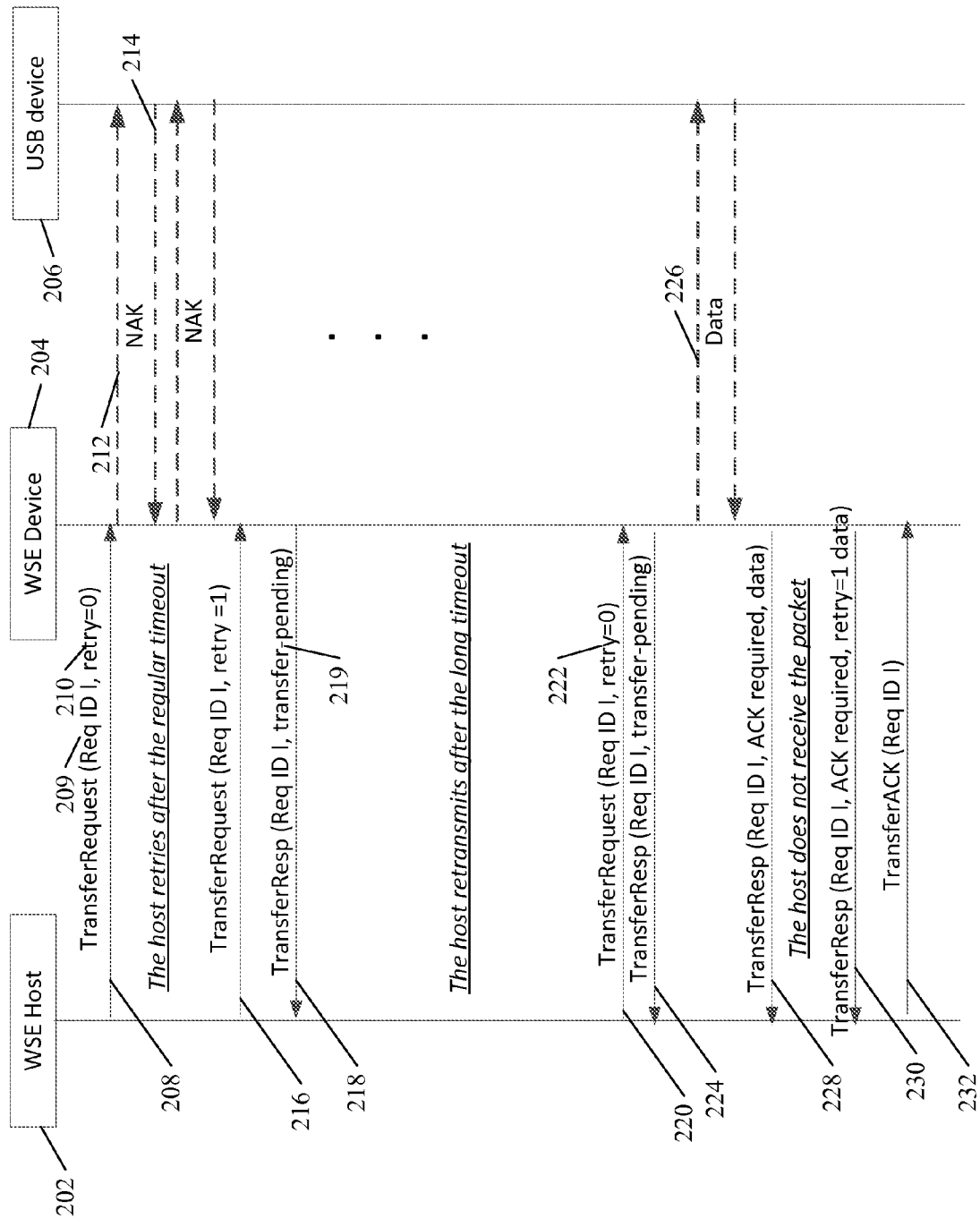
FIG. 2 is a schematic illustration of a sequence of communications between a Wireless-Gigabit (WiGig) Serial Extension (WSE) host, a WSE device and a Universal-Serial-Bus (USB) device, in accordance with some demonstrative embodiments.

Reference is made to FIG. 2, which schematically illustrates a sequence of communications between a WSE host 202, a WSE device 204 and a USB device 206, in accordance with some demonstrative embodiments. For example, PAL communication unit 130 (FIG. 1) may perform the functionality of WSE host 202, PAL communication unit 131 (FIG. 1) may perform the functionality of WSE device 204, and/or devices 162, 164, 166 and/or 168 (FIG. 1) may perform the functionality of USB device 206.

In some demonstrative embodiments, WSE host 202 may transmit to WSE device 204 a transfer request (TransferRequest) packet 208 including a request identifier (Request ID) 209 having a value, e.g., "Req ID 1", identifying a requested data block to be transferred from USB device 206 to WSE host 202 via WSE device 204.

In some demonstrative embodiments, the transfer request 208 may include a retry indicator 210, e.g., a retry flag, for example, in the form of a bit (Retry bit), having either a first value, e.g., "0", or a second value, e.g., "1". For example, the retry bit may be set to the value "0" to represent a first request for transfer, e.g., in a first transmission of the transfer request, or a retried request, e.g., in a subsequent transmission of the transfer request.

In some demonstrative embodiments, WSE device 204 may send one or more requests 212 to USB device 206 for transferring the requested data block.

In some demonstrative embodiments, WSE device 204 may experience delay in receiving data from USB device 206. For example, in some demonstrative embodiments, USB device 206 may respond to the USB requests with a NAK 214 indicating that the transfer of the requested data block is still pending.

In some demonstrative embodiments, WSE host 202 may retransmit the transfer request to WSE device 204, e.g., after a predefined timeout period. For example, the retransmitted transfer request may include a duplicate Transfer Request packet for the same Request ID. For example, WSE host 202 may transmit a retransmitted transfer request 216 including the same request ID, "request ID 1", as transfer request 208.

Retransmitted transfer request 216 may include the retry bit set to the value "1", to indicate that the transfer request 216 is to be treated as a retried transfer request.

In some demonstrative embodiments, WSE device 204 may transmit to WSE host 202 a transfer response (TransferResp) packet 218, e.g., in response to retransmitted packet 216.

In some demonstrative embodiments, TransferResp packet 218 may include no payload. Packet 218 may include a transfer pending status (Transfer_Pending) 219 indicating that data is pending to be received from USB device 206.

In some demonstrative embodiments, WSE device 204 may respond with Transfer Response packet 218 to a duplicate Transfer Request, e.g., transfer Request 216, having the same Request ID as a previous Transfer Request, e.g., regardless of the value of the retry bit of the duplicate transfer request.

In some demonstrative embodiments, WSE host 202 may receive Transfer Response packet 218 having the transfer pending status 219. WSE host 202 may reset a retransmission counter of WSE host, e.g., upon receiving Transfer Response packet 218 having the transfer pending status 219.

In some demonstrative embodiments, WSE host 202 may wait for a predefined timeout period, e.g., a WSELongKeepAlive period, before attempting to retransmit the transfer request.

In some demonstrative embodiments, WSE host 202 may retransmit the transfer request 220 to WSE device 204, e.g., after the predefined long timeout period.

In some demonstrative embodiments, retransmitted transfer request 220 may include the same request ID, "request ID 1", as the first transfer request 208, and may include the retry bit 220 set to the value zero. Setting the retry bit 222 to the value "zero" may indicate that the transfer request 220 is to be treated as a first transfer request, e.g., although the transfer request 220 is actually a retransmitted transfer request.

In some demonstrative embodiments, WSE device 204 may transmit to WSE host 202 a transfer response 224, in response to the second retransmitted transfer request 220. The transfer response 224 may include the transfer pending status code to indicate the transfer of the requested data block is still pending, e.g., although the second retransmitted transfer request 220 included the retry bit 222 set to the value zero, thereby indicating that the transfer request 220 is to be treated as a first transfer request.

In some demonstrative embodiments, WSE device 204 may receive the requested data block 226 from USB device 206.

In some demonstrative embodiments, WSE device 204 may transmit to WSE host 202 a transfer response 228 including the requested data block and an acknowledgement (ACK) request (ARQ) indicator indicating that an ACK is required. For example, the ARQ may include an ARQ bit set to a first value, e.g., "1", to indicate that an ACK is required. The ARQ bit may be set to a second value, e.g., "0", to indicate that an ACK is not required.

In some demonstrative embodiments, a transfer response including data transmitted by WSE device 204 may include a retry indicator, e.g., the retry bit, having a first value, e.g., "0", to indicate first transmission of the transfer response, or a second value, e.g., "1", to indicate the transfer response is retransmitted.

In some demonstrative embodiments, a first transfer response carrying data and transmitted by WSE device 204 following a transfer request having the transfer pending status code may include the ARQ bit set to "1". For example, the transfer response 228 may include the ARQ set to "1".

In some demonstrative embodiments, WSE device 204 may retransmit transfer response message 228, e.g., with the retry bit set to "1" and the ARQ bit set to "1", for example, if WSE device 204 does not receive a transfer acknowledgement (TransferACK) response within a predefined time period, e.g., a WSETransferKeepAlive period, after transmitting transfer response 228.

For example, as shown in FIG. 2 WSE host 202 may not receive the transfer response 228 including the requested data block. WSE device 204 may retransmit to WSE device 202 a transfer response 230 including the requested data block, the acknowledge bit indicating that an ACK is required, and the retry bit indicating that the transfer response is retransmitted.

In some demonstrative embodiments, WSE device may repeat the retransmission of transfer response 230, e.g., for a predefined number of times.

In some demonstrative embodiments, WSE host 202 may receive the retransmitted transfer response 230 including the requested data block.

In some demonstrative embodiments, WSE host 202 may transmit to WSE device 204 a transfer acknowledgement 232 to acknowledge receipt of the requested data block 230.

Figure 3:
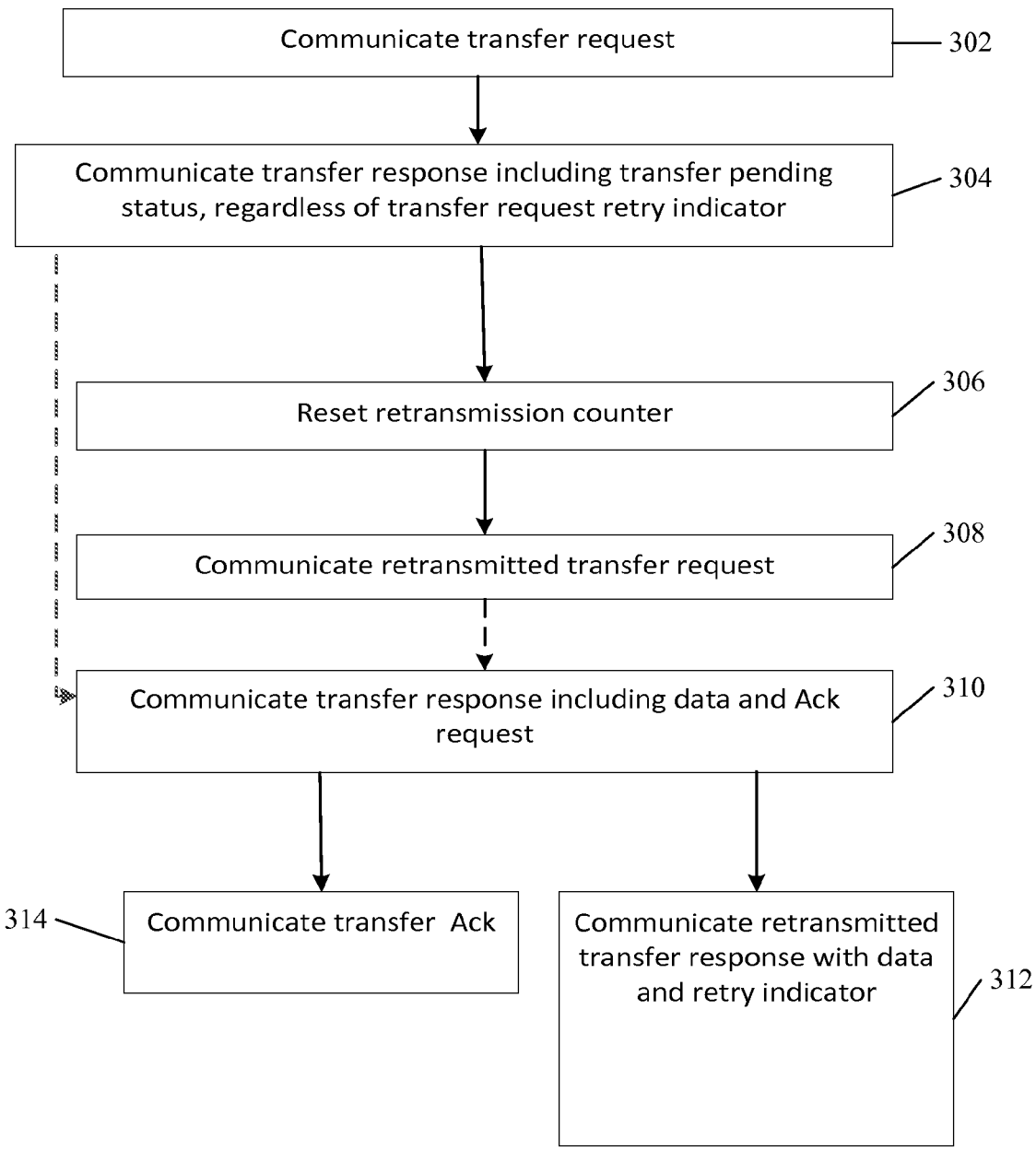
FIG. 3 is a schematic flow-chart illustration of a method of controlling data flow, in accordance with some demonstrative embodiments.

Reference is made to FIG. 3, which schematically illustrates a method of controlling data flow, in accordance with some demonstrative embodiments. In some embodiments, one or more of the operations of the method of FIG. 3 may be performed by a system, e.g., system 100 (FIG. 1); a device, e.g., device 102 (FIG. 1) and/or device 104 (FIG. 1); a PAL communication unit, e.g., PAL communication unit 130 (FIG. 1) and/or PAL communication unit 131 (FIG. 1); a WSE host, e.g., WSE host 202 (FIG. 2); and/or a WSE device, e.g., WSE device 204 (FIG. 2).

As indicated at block 302, the method may include communicating a transfer request over a communication link between a first device and a second device. For example, the transfer request may include a request for data to be transferred from the second device to the first device. For example, PAL communication unit 130 (FIG. 1) may transmit to PAL communication unit 131 (FIG. 1) a transfer request for data from EP 134, EP 135, EP 136, 138 and/or EP 140 (FIG. 1), e.g., as described above. In one example, WSE host 202 (FIG. 2) may transmit to WSE device 204 (FIG. 2) a transfer request for transferring data from USB device 206 (FIG. 2) to WSE host 202 (FIG. 2), e.g., as described above.

As indicated at block 304, the method may include, regardless of whether a retry indicator of the transfer request represents a first request or a retried request, communicating a transfer response in response to the transfer request, wherein the transfer response includes a transfer pending status indicating the data is pending to be received at the second device. For example, PAL communication unit 131 (FIG. 1) may transmit the transfer response to PAL communication unit 130 (FIG. 1), e.g., as described above. In one example, WSE device 204 (FIG. 2) may transmit to WSE host 202 (FIG. 2), transfer response 218 (FIG. 2), e.g., in response to transfer request 216 (FIG. 2) including the retry bit set to "1"; and transfer response 224 (FIG. 2), e.g., in response to transfer request 220 (FIG. 2) including the retry bit set to "0".

As indicated at block 306, the method may include resetting a retransmission counter, e.g., upon receiving the transfer response with the transfer pending status. For example, WSE host 202 (FIG. 2) may reset a retransmission counter of WSE host 202 (FIG. 2), e.g., upon receiving transfer response 218 (FIG. 2), e.g., as described above.

As indicated at block 308, the method may include communicating a retransmitted transfer request after waiting a predefined timeout period. For example, WSE host 202 (FIG. 2) may retransmit transfer request 220 (FIG. 2), e.g., after waiting a WSELongKeepAlive period, e.g., as described above.

As indicated at block 310, the method may include communicating a transfer response, the transfer response including data requested by the transfer request, and an acknowledgement-request indicator requesting to acknowledge receipt of the transfer response including the data. The transfer response including the data may be transmitted from the WSE device to the WSE host, for example, upon receipt from the USB device, e.g., prior to communicating the retransmitted transfer request or after communicating the retransmitted transfer request one or more times. For example, PAL communication unit 131 (FIG. 1) may transmit to PAL communication unit 130 (FIG. 1) the transfer response including the requested data, e.g., as described above. In one example, WSE device 204 (FIG. 2) may transmit to WSE host 202 (FIG. 2) the Transfer Response 228 including the ARQ bit set to "1", e.g., as described above.

As indicated at block 312, the method may include retransmitting the transfer response including the data and a retry bit set to a predefined retransmit value, e.g., if a transfer acknowledgement response is not received within a predefined time period. The transfer response may be retransmitted for one or more times, e.g., if a transfer ACK is not received within a predefined period. For example, PAL communication unit 131 (FIG. 1) may retransmit the transfer response including the data and the retry bit set to "1", e.g., if the transfer acknowledgement response is not received from PAL communication unit 130 (FIG. 1) within a predefined time period, e.g., as described above. In one example, WSE device 204 (FIG. 2) may retransmit transfer response 230 (FIG. 2) including the retry bit set to "1", e.g., as described above.

As indicated at block 314, the method may include communicating a transfer acknowledgement, in response to the transfer response including the data. For example, PAL communication unit 130 (FIG. 1) may transmit to PAL communication unit 131 (FIG. 1) and ACK message to acknowledged receipt of the transfer response including the requested data. In one example, WSE host 202 (FIG. 2) may transmit TransferACK 232 (FIG. 2) to WSE device 204 (FIG. 2), e.g., as described above.

Figure 4:
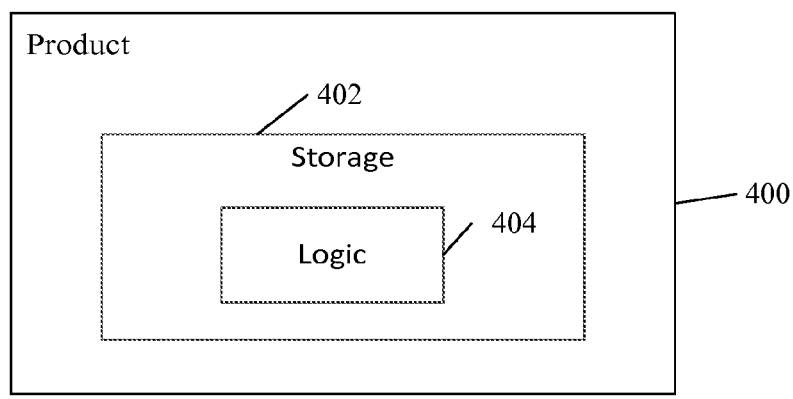
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), device 104 (FIG. 1), PAL communication unit 130 (FIG. 1), and/or PAL communication unit 131 (FIG. 1), to perform one or more of the operations FIG. 2, and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 is an apparatus comprising a communication unit to perform the functionality of a device selected from the group consisting of a first device and a second device, the second device is to transfer data from an endpoint to the first device over a communication link, wherein the communication unit is to communicate between the first and second devices a transfer response, the transfer response in response to a transfer request, the transfer response including a transfer pending status indicating data is pending to be received from the endpoint at the second device, the communication unit is to communicate the transfer response regardless of whether a retry indicator of the transfer request represents a first request for transfer or a retried request.

Example 2 includes the subject matter of Example 1 and optionally, wherein in response to the transfer request including the retry indicator set to a first value representing the retried request, the communication unit is to communicate the transfer response including the transfer pending status, and to communicate a subsequent transfer request including the retry indicator set to a second value, different from the first value, representing the first request for transfer.

Example 3 includes the subject matter of Example 2 and optionally, wherein the communication unit is to communicate the subsequent transfer request at least a predefined timeout period after the transfer response.

Example 4 includes the subject matter of any one of Examples 1-3 and optionally, wherein the communication unit is to perform the functionality of the first device, the communication unit is to transmit the transfer request, to receive the transfer response including the transfer pending status, to reset a retransmission counter, and to retransmit the transfer request after waiting a predefined timeout period.

Example 5 includes the subject matter of any one of Examples 1-3 and optionally, wherein the communication unit is to perform the functionality of the second device, the communication unit is to receive the transfer request including a duplicate transfer request of a previously received transfer request for a same request identifier, and to transmit the transfer response including the transfer pending status without a payload.

Example 6 includes the subject matter of any one of Examples 1-5 and optionally, wherein the communication unit is to communicate a subsequent transfer response including data requested by the transfer request, and an acknowledgement-request indicator requesting the first device to acknowledge receipt of the subsequent transfer response.

Example 7 includes the subject matter of Example 6 and optionally, wherein the subsequent transfer response comprises a first transfer response including data following the transfer response including the transfer pending status.

Example 8 includes the subject matter of Example 6 or 7 and optionally, wherein the communication unit is to communicate a transfer acknowledgement, in response to the subsequent transfer response.

Example 9 includes the subject matter of any one of Examples 6-8 and optionally, wherein the subsequent transfer response includes a retry indicator having a first value to indicate first transmission of the subsequent transfer response, or a second value to indicate the subsequent transfer response is retransmitted.

Example 10 includes the subject matter of any one of Examples 6-9 and optionally, wherein the communication unit is to perform the functionality of the second device, the communication unit is to transmit the subsequent transfer response, and to retransmit the subsequent transfer response including a retry bit set to a predefined retransmit value, if a transfer acknowledgement response is not received from the first device within a predefined time period.

Example 11 includes the subject matter of Example 1 and optionally, wherein the communication unit is to perform the functionality of the first device, the communication unit is to transmit the transfer request to the second device, and to receive the transfer response from the second device.

Example 12 includes the subject matter of Example 1 and optionally, wherein the communication unit is to perform the functionality of the second device, the communication unit is to receive the transfer request from the first device, and to transmit the transfer response to the first device.

Example 13 includes the subject matter of any one of Examples 1-12 and optionally, wherein the first device comprises a Universal Serial Bus (USB) host Protocol Adaptation Layer (PAL), and wherein the second device comprises a USB Device PAL.

Example 14 includes the subject matter of any one of Examples 1-13 and optionally, wherein the communication link comprises a wireless communication link.

Example 15 includes the subject matter of Example 14 and optionally, wherein the wireless communication link comprises a wireless gigabit (WiGig) link.

Example 16 includes the subject matter of any one of Examples 1-15 and optionally, wherein the first device comprises a wireless gigabit (WiGig) Serial Extension (WSE) host, and wherein the second device comprises a WSE Device.

Example 17 includes a communication system comprising a communication device comprising a network interface to communicate over a network; and a communication unit to perform the functionality of a first device or a second device, the second device is to transfer data to the first device over a communication link, wherein the communication unit is to communicate between the first and second devices a transfer response, the transfer response in response to a transfer request, the transfer response including a transfer pending status indicating data is pending to be received at the second device, the communication unit is to communicate the transfer response regardless of whether a retry indicator of the transfer request represents a first request for transfer or a retried request.

Example 18 includes the subject matter of Example 17 and optionally, wherein in response to the transfer request including the retry indicator set to a first value representing the retried request, the communication unit is to communicate the transfer response including the transfer pending status, and to communicate a subsequent transfer request including the retry indicator set to a second value, different from the first value, representing the first request for transfer.

Example 19 includes the subject matter of Example 18 and optionally, wherein the communication unit is to communicate the subsequent transfer request at least a predefined timeout period after the transfer response.

Example 20 includes the subject matter of any one of Examples 17-19 and optionally, wherein the communication unit is to perform the functionality of the first device, the communication unit is to transmit the transfer request, to receive the transfer response including the transfer pending status, to reset a retransmission counter, and to retransmit the transfer request after waiting a predefined timeout period.

Example 21 includes the subject matter of any one of Examples 17-19 and optionally, wherein the communication unit is to perform the functionality of the second device, the communication unit is to receive the transfer request including a duplicate transfer request of a previously received transfer request for a same request identifier, and to transmit the transfer response including the transfer pending status without a payload.

Example 22 includes the subject matter of any one of Examples 17-21 and optionally, wherein the communication unit is to communicate a subsequent transfer response including data requested by the transfer request, and an acknowledgement-request indicator requesting the first device to acknowledge receipt of the subsequent transfer response.

Example 23 includes the subject matter of Example 22 and optionally, wherein the subsequent transfer response comprises a first transfer response including data following the transfer response including the transfer pending status.

Example 24 includes the subject matter of Example 22 or 23 and optionally, wherein the communication unit is to communicate a transfer acknowledgement, in response to the subsequent transfer response.

Example 25 includes the subject matter of any one of Examples 22-24 and optionally, wherein the subsequent transfer response includes a retry indicator having a first value to indicate first transmission of the subsequent transfer response, or a second value to indicate the subsequent transfer response is retransmitted.

Example 26 includes the subject matter of any one of Examples 22-25 and optionally, wherein the communication unit is to perform the functionality of the second device, the communication unit is to transmit the subsequent transfer response, and to retransmit the subsequent transfer response including a retry bit set to a predefined retransmit value, if a transfer acknowledgement response is not received from the first device within a predefined time period.

Example 27 includes the subject matter of Example 17 and optionally, wherein the communication unit is to perform the functionality of the first device, the communication unit is to transmit the transfer request to the second device, and to receive the transfer response from the second device.

Example 28 includes the subject matter of Example 17 and optionally, wherein the communication unit is to perform the functionality of the second device, the communication unit is to receive the transfer request from the first device, and to transmit the transfer response to the first device.

Example 29 includes the subject matter of any one of Examples 17-28 and optionally, wherein the first device comprises a Universal Serial Bus (USB) host Protocol Adaptation Layer (PAL), and wherein the second device comprises a USB Device PAL.

Example 30 includes the subject matter of any one of Examples 17-29 and optionally, wherein the communication link comprises a wireless communication link.

Example 31 includes the subject matter of Example 30 and optionally, wherein the wireless communication link comprises a wireless gigabit (WiGig) link.

Example 32 includes the subject matter of any one of Examples 17-31 and optionally, wherein the first device comprises a wireless gigabit (WiGig) Serial Extension (WSE) host, and wherein the second device comprises a WSE Device.

Example 33 includes a system comprising a device comprising a network interface to communicate over a network; and a wireless gigabit (WiGig) Serial Extension (WSE) controller to perform the functionality of a WSE host or a WSE device to communicate Universal Serial Bus (USB) data between a USB device and a USB host over the network, the data including data to be delivered from the USB device to the USB host, wherein the WSE controller is to communicate between the WSE host and WSE device a transfer request, and to communicate a transfer response, the transfer response in response to the transfer request, the transfer response including a data payload from the USB device and an acknowledgement-request indicator requesting the WSE host to acknowledge receipt.

Example 34 includes the subject matter of Example 33 and optionally, wherein the WSE controller is to communicate a transfer acknowledgement, in response to the transfer response.

Example 35 includes the subject matter of Example 33 or 34 and optionally, wherein the transfer response includes a retry indicator having a first value to indicate first transmission of the transfer response, or a second value to indicate the transfer response is retransmitted.

Example 36 includes the subject matter of any one of Examples 33-35 and optionally, wherein the WSE controller is to perform the functionality of the WSE device, the WSE device is to transmit the transfer response, and to retransmit the transfer response including a retry bit set to a predefined retransmit value, if a transfer acknowledgement response is not received from the WSE host within a predefined time period.

Example 37 includes the subject matter of any one of Examples 33-35 and optionally, wherein the WSE controller is to perform the functionality of the WSE device, the WSE device is to transmit the transfer response to the WSE host.

Example 38 includes the subject matter of any one of Examples 33-35 and optionally, wherein the WSE controller is to perform the functionality of the WSE host, the WSE host is to receive the transfer response from the WSE device.

Example 39 includes the subject matter of any one of Examples 33-38 and optionally, wherein the communication link comprises a wireless communication link.

Example 40 include a communication method comprising communicating a transfer request over a communication link between a first device and a second device, the transfer request including a request for data from to be transferred from the second device to the first device; and communicating a transfer response, the transfer response in response to the transfer request, the transfer response including a transfer pending status indicating the data is pending to be received at the second device, wherein communicating the transfer response comprises communicating the transfer response regardless of whether a retry indicator of the transfer request represents a first request or a retried request.

Example 41 includes the subject matter of Example 40 and optionally, including in response to the transfer request including the retry indicator set to a first value representing the retried request, communicating the transfer response including the transfer pending status; and communicating a subsequent transfer request including the retry indicator set to a second value, different from the first value, representing the first request for transfer.

Example 42 includes the subject matter of Example 41 and optionally, comprising communicating the subsequent transfer request at least a predefined timeout period after the transfer response.

Example 43 includes the subject matter of any one of Examples 40-42 and optionally, comprising transmitting the transfer request, receiving the transfer response including the transfer pending status, resetting a retransmission counter, and retransmitting the transfer request after waiting a predefined timeout period.

Example 44 includes the subject matter of any one of Examples 40-42 and optionally, comprising receiving the transfer request including a duplicate transfer request of a previously received transfer request for a same request identifier, and transmitting the transfer response including the transfer pending status without a payload.

Example 45 includes the subject matter of any one of Examples 40-44 and optionally, comprising communicating a subsequent transfer response including data requested by the transfer request, and an acknowledgement-request indicator requesting the first device to acknowledge receipt of the subsequent transfer response.

Example 46 includes the subject matter of Example 45 and optionally, wherein the subsequent transfer response comprises a first transfer response including data following the transfer response including the transfer pending status.

Example 47 includes the subject matter of Example 45 or 46 and optionally, comprising communicating a transfer acknowledgement, in response to the subsequent transfer response.

Example 48 includes the subject matter of any one of Examples 45-47 and optionally, wherein the subsequent transfer response includes a retry indicator having a first value to indicate first transmission of the subsequent transfer response, or a second value to indicate the subsequent transfer response is retransmitted.

Example 49 includes the subject matter of any one of Examples 45-48 and optionally, comprising transmitting the subsequent transfer response, and retransmitting the subsequent transfer response including a retry bit set to a predefined retransmit value, if a transfer acknowledgement response is not received from the first device within a predefined time period.

Example 50 includes the subject matter of Example 40 and optionally, comprising transmitting the transfer request to the second device, and receiving the transfer response from the second device.

Example 51 includes the subject matter of Example 40 and optionally, comprising receiving the transfer request from the first device, and transmitting the transfer response to the first device.

Example 52 includes the subject matter of any one of Examples 40-51 and optionally, wherein the first device comprises a Universal Serial Bus (USB) host Protocol Adaptation Layer (PAL), and wherein the second device comprises a USB Device PAL.

Example 53 includes the subject matter of any one of Examples 40-52 and optionally, wherein the communication link comprises a wireless communication link.

Example 54 includes the subject matter of Example 53 and optionally, wherein the wireless communication link comprises a wireless gigabit (WiGig) link.

Example 55 includes the subject matter of any one of Examples 40-54 and optionally, wherein the first device comprises a wireless gigabit (WiGig) Serial Extension (WSE) host, and wherein the second device comprises a WSE Device.

Example 56 includes a product including a non-transitory storage medium having stored thereon instructions that, when executed by a machine, result in communicating a transfer request over a communication link between a first device and a second device, the transfer request to request data to be transferred from the second device to the first device; and communicating a transfer response, the transfer response in response to the transfer request, the transfer response including data and an acknowledgement request indicator requesting the first device to acknowledge receipt.

Example 57 includes the subject matter of Example 56 and optionally, wherein the instructions result in: in response to the transfer request including the retry indicator set to a first value representing the retried request, communicating the transfer response including the transfer pending status; and communicating a subsequent transfer request including the retry indicator set to a second value, different from the first value, representing the first request for transfer.

Example 58 includes the subject matter of Example 57 and optionally, wherein the instructions result in communicating the subsequent transfer request at least a predefined timeout period after the transfer response.

Example 59 includes the subject matter of any one of Examples 56-58 and optionally, wherein the instructions result in transmitting the transfer request, receiving the transfer response including the transfer pending status, resetting a retransmission counter, and retransmitting the transfer request after waiting a predefined timeout period.

Example 60 includes the subject matter of any one of Examples 56-58 and optionally, wherein the instructions result in receiving the transfer request including a duplicate transfer request of a previously received transfer request for a same request identifier, and transmitting the transfer response including the transfer pending status without a payload.

Example 61 includes the subject matter of any one of Examples 56-60 and optionally, wherein the instructions result in communicating a subsequent transfer response including data requested by the transfer request, and an acknowledgement-request indicator requesting the first device to acknowledge receipt of the subsequent transfer response.

Example 62 includes the subject matter of Example 61 and optionally, wherein the subsequent transfer response comprises a first transfer response including data following the transfer response including the transfer pending status.

Example 63 includes the subject matter of Example 61 or 62 and optionally, wherein the instructions result in communicating a transfer acknowledgement, in response to the subsequent transfer response.

Example 64 includes the subject matter of any one of Examples 61-63 and optionally, wherein the subsequent transfer response includes a retry indicator having a first value to indicate first transmission of the subsequent transfer response, or a second value to indicate the subsequent transfer response is retransmitted.

Example 65 includes the subject matter of any one of Examples 61-64 and optionally, wherein the instructions result in transmitting the subsequent transfer response, and retransmitting the subsequent transfer response including a retry bit set to a predefined retransmit value, if a transfer acknowledgement response is not received from the first device within a predefined time period.

Example 66 includes the subject matter of Example 56 and optionally, wherein the instructions result in transmitting the transfer request to the second device, and receiving the transfer response from the second device.

Example 67 includes the subject matter of Example 56 and optionally, wherein the instructions result in receiving the transfer request from the first device, and transmitting the transfer response to the first device.

Example 68 includes the subject matter of any one of Examples 56-67 and optionally, wherein the first device comprises a Universal Serial Bus (USB) host Protocol Adaptation Layer (PAL), and wherein the second device comprises a USB Device PAL.

Example 69 includes the subject matter of any one of Examples 56-68 and optionally, wherein the communication link comprises a wireless communication link.

Example 70 includes the subject matter of Example 69 and optionally, wherein the wireless communication link comprises a wireless gigabit (WiGig) link.

Example 71 includes the subject matter of any one of Examples 56-70 and optionally, wherein the first device comprises a wireless gigabit (WiGig) Serial Extension (WSE) host, and wherein the second device comprises a WSE Device.

Example 72 includes a communication apparatus comprising means for communicating a transfer request over a communication link between a first device and a second device, the transfer request to request data to be transferred from the second device to the first device; and means for communicating a transfer response, the transfer response in response to the transfer request, the transfer response including data and an acknowledgement request indicator requesting the first device to acknowledge receipt.

Example 73 includes the subject matter of Example 72 and optionally, wherein in response to the transfer request including the retry indicator set to a first value representing the retried request, the means for communicating the transfer response is to communicate the transfer response including the transfer pending status, and wherein the means for communicating the transfer request is to communicate a subsequent transfer request including the retry indicator set to a second value, different from the first value, representing the first request for transfer.

Example 74 includes the subject matter of Example 73 and optionally, wherein the means for communicating the transfer request is to communicate the subsequent transfer request at least a predefined timeout period after the transfer response.

Example 75 includes the subject matter of any one of Examples 72-74 and optionally, wherein the means for communicating the transfer request is to transmit the transfer request, the means for communicating the transfer response is to receive the transfer response including the transfer pending status, the apparatus comprising means for resetting a retransmission counter, and the means for communicating the transfer request is to retransmit the transfer request after waiting a predefined timeout period.

Example 76 includes the subject matter of any one of Examples 72-74 and optionally, wherein the means for communicating the transfer request is receive the transfer request including a duplicate transfer request of a previously received transfer request for a same request identifier, and the means for communicating the transfer response is to transmit the transfer response including the transfer pending status without a payload.

Example 77 includes the subject matter of any one of Examples 72-76 and optionally, comprising means for communicating a subsequent transfer response including data requested by the transfer request, and an acknowledgement-request indicator requesting the first device to acknowledge receipt of the subsequent transfer response.

Example 78 includes the subject matter of Example 77 and optionally, wherein the subsequent transfer response comprises a first transfer response including data following the transfer response including the transfer pending status.

Example 79 includes the subject matter of Example 77 or 78 and optionally, comprising means for communicating a transfer acknowledgement, in response to the subsequent transfer response.

Example 80 includes the subject matter of any one of Examples 77-79 and optionally, wherein the subsequent transfer response includes a retry indicator having a first value to indicate first transmission of the subsequent transfer response, or a second value to indicate the subsequent transfer response is retransmitted.

Example 81 includes the subject matter of any one of Examples 77-80 and optionally, comprising means for transmitting the subsequent transfer response, and retransmitting the subsequent transfer response including a retry bit set to a predefined retransmit value, if a transfer acknowledgement response is not received from the first device within a predefined time period.

Example 82 includes the subject matter of Example 72 and optionally, comprising means for transmitting the transfer request to the second device, and means for receiving the transfer response from the second device.

Example 83 includes the subject matter of Example 72 and optionally, comprising means for receiving the transfer request from the first device, and means for transmitting the transfer response to the first device.

Example 84 includes the subject matter of any one of Examples 72-83 and optionally, wherein the first device comprises a Universal Serial Bus (USB) host Protocol Adaptation Layer (PAL), and wherein the second device comprises a USB Device PAL.

Example 85 includes the subject matter of any one of Examples 72-84 and optionally, wherein the communication link comprises a wireless communication link.

Example 86 includes the subject matter of Example 85 and optionally, wherein the wireless communication link comprises a wireless gigabit (WiGig) link.

Example 87 includes the subject matter of any one of Examples 72-86 and optionally, wherein the first device comprises a wireless gigabit (WiGig) Serial Extension (WSE) host, and wherein the second device comprises a WSE Device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising:
 a communication unit to communicate over a communication link between a first device and a second device; and
 a processor configured to cause the communication unit to transmit a transfer request from a Universal Serial Bus (USB) Protocol Adaptation Layer (PAL) host on the first device to a USB PAL device on the second device, the processor to process a transfer response with no data payload, the transfer response from the USB PAL device to the USB PAL host, the transfer request to initiate transfer of data from a USB endpoint of the second device to the USB PAL host, the transfer response in response to the transfer request, the transfer response including a transfer pending status code to indicate to the USB PAL host that data receipt from the USB endpoint is delayed and pending to be received at said USB PAL device, the transfer response comprising a same request Identifier (ID) as a request ID in the transfer request, said transfer response comprising the transfer pending status code regardless of whether a retry indicator of said transfer request represents a first request for transfer or a retried request, the processor configured to, based on the transfer pending status code indicating that the data receipt from the USB endpoint is delayed, set an extended retransmission period for the USB PAL host to wait prior to retransmitting the transfer request.

2. The apparatus of claim 1, wherein, when said transfer request includes said retry indicator set to a first value representing the retried request, said processor is to cause transmission of a subsequent transfer request including said retry indicator set to a second value, different from said first value, representing the first request for transfer.

3. The apparatus of claim 2, wherein the subsequent transfer request is at least a predefined timeout period after said transfer response.

4. The apparatus of claim 1, wherein said processor is configured to, in response to said transfer response including said transfer pending status code, reset a retransmission counter to count the extended retransmission period.

5. The apparatus of claim 1, wherein said processor is configured to process a subsequent transfer response from the USB PAL device, the subsequent transfer response including data requested by the transfer request, and an acknowledgement-request indicator requesting the USB PAL host to acknowledge receipt of the subsequent transfer response.

6. The apparatus of claim 5, wherein said subsequent transfer response comprises a first transfer response including data following the transfer response including said transfer pending status code.

7. The apparatus of claim 5, wherein said processor is to cause the communication unit to transmit a transfer acknowledgement, in response to said subsequent transfer response.

8. The apparatus of claim 5, wherein said subsequent transfer response includes a retry indicator having a first value to indicate first transmission of said subsequent transfer response, or a second value to indicate said subsequent transfer response is retransmitted.

9. The apparatus of claim 1, wherein said communication link comprises a wireless communication link.

10. The apparatus of claim 9, wherein said wireless communication link comprises a wireless gigabit (WiGig) link.

11. The apparatus of claim 1, wherein said first device comprises a wireless gigabit (WiGig) Serial Extension (WSE) host, and wherein said second device comprises a WSE Device.

12. A system comprising:
a first device comprising:
a network interface to communicate over a network between the first device and a second device; and
a processor configured to cause the network interface to transmit a transfer request from a Universal Serial Bus (USB) Protocol Adaptation Layer (PAL) host on the first device to a USB PAL device on the second device, the processor to process a first transfer response from the USB PAL device to the USB PAL host, the transfer request to initiate transfer of data from a USB endpoint of the second device, the first transfer response in response to said transfer request, the first transfer response including a transfer pending status code to indicate to the USB PAL host that data receipt from the USB endpoint is delayed and pending to be received at said USB PAL device, the processor configured to, based on the transfer pending status code indicating that the data receipt from the USB endpoint is delayed, set an extended retransmission period for the USB PAL host to wait prior to retransmitting the transfer request, the processor to process a second transfer response including a data payload from said USB endpoint and an acknowledgement-request indicator requesting the USB PAL host to acknowledge receipt of the second transfer response, the processor to cause the network interface to transmit to the second device a transfer acknowledgement to acknowledge receipt of the second transfer response.

13. The system of claim 12, wherein said second transfer response includes a retry indicator having a first value to indicate first transmission of said second transfer response, or a second value to indicate said second transfer response is retransmitted.

14. The system of claim 12, wherein said processor is configured to process a retransmission from the second device of the second transfer response including a retry bit set to a predefined retransmit value to indicate the transfer acknowledgement response is not received from said first device within a predefined time period.

15. The system of claim 12, wherein said communication link comprises a wireless communication link.

16. A method comprising:
transmitting a transfer request from a Universal Serial Bus (USB) Protocol Adaptation Layer (PAL) host on a first device to a USB PAL device on a second device, the transfer request to initiate transfer of data from a USB endpoint of the second device to the USB PAL host;
processing a transfer response with no data payload, the transfer response from the USB PAL device to the USB PAL host, the transfer response in response to said transfer request, the transfer response including a transfer pending status code to indicate to the USB PAL host that data receipt from the USB endpoint is delayed and pending to be received at said USB PAL device, the transfer response comprising a same request Identifier (ID) as a request ID in the transfer request, said transfer response comprising the transfer pending status code regardless of whether a retry indicator of said transfer request represents a first request or a retried request, and
based on the transfer pending status code indicating that the data receipt from the USB endpoint is delayed, setting an extended retransmission period for the USB PAL host to wait prior to retransmitting the transfer request.

17. The method of claim 16 comprising:
when said transfer request includes said retry indicator set to a first value representing the retried request, causing transmission of a subsequent transfer request including said retry indicator set to a second value, different from said first value, representing the first request for transfer.

18. The method of claim 16 comprising processing a subsequent transfer response from the USB PAL device, the subsequent transfer response including data requested by the transfer request, and an acknowledgement-request indicator requesting the USB PAL host to acknowledge receipt of the subsequent transfer response.

19. The method of claim 18, wherein said subsequent transfer response includes a retry indicator having a first value to indicate first transmission of said subsequent transfer response, or a second value to indicate said subsequent transfer response is retransmitted.

20. A product including a non-transitory storage medium having stored thereon instructions that, when executed by a machine, result in:
transmitting a transfer request from a Universal Serial Bus (USB) Protocol Adaptation Layer (PAL) host on a first device to a USB PAL device on a second device, the transfer request to initiate transfer of data from a USB endpoint of the second device;
processing a first transfer response from the USB PAL device to the USB PAL host, the first transfer response in response to said transfer request, the first transfer response including a transfer pending status code to indicate to the USB PAL host that data receipt from the USB endpoint is delayed and pending to be received at said USB PAL device;

based on the transfer pending status code indicating that the data receipt from the USB endpoint is delayed, setting an extended retransmission period for the USB PAL host to wait prior to retransmitting the transfer request;

processing a second transfer response including a data payload from said USB endpoint and an acknowledgement request indicator requesting the USB PAL host to acknowledge receipt of the second transfer response; and transmitting a transfer acknowledgement from the USB PAL host to the USB PAL device to acknowledge receipt of the second transfer response.

21. The product of claim 20, wherein said second transfer response includes a retry indicator having a first value to indicate first transmission of said second transfer response, or a second value to indicate said second transfer response is retransmitted.

22. The product of claim 20, wherein said instructions result in processing a retransmission from the second device of the second transfer response including a retry bit set to a predefined retransmit value to indicate the transfer acknowledgement response is not received from said first device within a predefined time period.

* * * * *